(12) United States Patent
Lee et al.

(10) Patent No.: US 11,886,692 B2
(45) Date of Patent: Jan. 30, 2024

(54) METHOD TO PROVIDE DESIGN INFORMATION

(71) Applicant: CLO Virtual Fashion Inc., Seoul (KR)

(72) Inventors: Hyun Ji Lee, Seoul (KR); Caley Rowe Taylor, Chatham, NJ (US)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 17/672,568

(22) Filed: Feb. 15, 2022

(65) Prior Publication Data

US 2022/0171526 A1 Jun. 2, 2022

Related U.S. Application Data

(63) Continuation of application No. 16/859,144, filed on Apr. 27, 2020, now Pat. No. 11,281,365.

(51) Int. Cl.
  *G06F 9/451* (2018.01)
  *G06F 3/04847* (2022.01)
  *G06F 3/0482* (2013.01)

(52) U.S. Cl.
  CPC ........ *G06F 3/04847* (2013.01); *G06F 3/0482* (2013.01); *G06F 9/451* (2018.02)

(58) Field of Classification Search
  CPC .................................................. G06F 3/0488
  See application file for complete search history.

(56) References Cited

U.S. PATENT DOCUMENTS

| 8,229,278 B2 | 7/2012 | Eklund et al. |
| 9,971,854 B1 * | 5/2018 | Bowen ................... A41H 3/007 |
| 2010/0214442 A1 * | 8/2010 | Uemura ................. H04N 5/772 |
| | | 348/222.1 |

(Continued)

FOREIGN PATENT DOCUMENTS

| KR | 101701630 B1 | 2/2017 |
| KR | 101784355 B1 | 11/2017 |

(Continued)

OTHER PUBLICATIONS

Chinese Patent Application No. 202010087107, filed Feb. 11, 2020, Inventor Oh, S.

(Continued)

*Primary Examiner* — Di Xiao
(74) *Attorney, Agent, or Firm* — WTA Patents

(57) ABSTRACT

According to an exemplary embodiment of the present disclosure, disclosed is a computer program stored in a computer readable storage medium. When the computer program is executed by one or more processors of a computing device, the computer program provides a user interface (UI) to display design information, and the user interface may include: a design group generation layer for generating a design group, and the design group generation layer includes one or more design file regions each of which are associated with a design file, and the design file region may include: a first sub region displaying a design image; and a second sub region displaying one or more design attribute objects, which allows user selection input for at least some of one or more design attributes included in the design file.

19 Claims, 8 Drawing Sheets

(56) References Cited

U.S. PATENT DOCUMENTS

| | | | |
|---|---|---|---|
| 2012/0265644 A1* | 10/2012 | Roa | H04W 4/80 |
| | | | 705/26.61 |
| 2013/0110679 A1 | 5/2013 | Spadafora et al. | |
| 2014/0022238 A1 | 1/2014 | Oh | |
| 2014/0053228 A1* | 2/2014 | Mahadevan | G06F 16/176 |
| | | | 726/1 |
| 2015/0366293 A1 | 12/2015 | Clarkson | |
| 2016/0358374 A1* | 12/2016 | Ju | H04N 13/204 |
| 2017/0004567 A1 | 1/2017 | Dutt et al. | |
| 2017/0032554 A1 | 2/2017 | O'Donovan et al. | |
| 2018/0350117 A1* | 12/2018 | Ogata | G06Q 50/10 |
| 2019/0004688 A1 | 1/2019 | Bowen | |
| 2019/0026393 A1* | 1/2019 | Barnes | G06F 30/00 |
| 2019/0026397 A1 | 1/2019 | Barnes et al. | |
| 2019/0347364 A1 | 11/2019 | Gupta et al. | |
| 2019/0368085 A1* | 12/2019 | Morgan | A41H 43/00 |
| 2020/0242174 A1* | 7/2020 | Biran | G06F 16/953 |
| 2020/0372560 A1* | 11/2020 | Dahl | G06Q 30/0625 |
| 2020/0375293 A1* | 12/2020 | Koh | G06Q 30/0641 |
| 2021/0192814 A1 | 6/2021 | Oh | |

FOREIGN PATENT DOCUMENTS

| | | |
|---|---|---|
| KR | 10-2011055 B1 | 8/2019 |
| KR | 10-2019-0131268 A | 11/2019 |
| WO | WO2010013122 A2 | 2/2010 |
| WO | WO2019164741 A1 | 8/2019 |

OTHER PUBLICATIONS

Korean Patent Application No. 10-2019-0172432, filed Dec. 20, 2019, Inventor Oh, S.

Techpacker, "An intuitive platform to manage product creation in one place," 2020, 9 pages [Retrieved from the Internet] Retrieved on Apr. 24, 2020 <URL: https://www.techpacker.com/>.

United States Office Action, U.S. Appl. No. 16/859,144, dated Jul. 30, 2021, 32 pages.

United States Office Action, U.S. Appl. No. 16/859,144, dated Feb. 18, 2021, 29 pages.

* cited by examiner

METHOD TO PROVIDE DESIGN INFORMATION

CROSS-REFERENCE TO RELATED APPLICATION

This application is a continuation of U.S. patent application Ser. No. 16/859,144, filed on Apr. 27, 2020, which is incorporated by reference herein in its entirety.

TECHNICAL FIELD

The present disclosure relates to providing design information, and more particularly, to a method of providing a user interface displaying design information.

BACKGROUND ART

In the existing clothing production industry, in order to transmit clothing data according to design work, work is carried in the form of writing the necessary contents by hand or directly delivering actual samples (for example, fabric and subsidiary materials). When the actual sample is delivered through offline, there is a problem that it takes a long time, and when a photo and the like is transmitted through online, there is a problem that it is difficult to accurately deliver information.

With the recent development of the industry, there is an operation to digitize offline data, and in response to the trend of industrial development, there is a demand in the clothing industry to digitize design data.

When the digitized design data is provided to a user, it may be important to allow the user to intuitively understand data and manipulate the data on a user interface. Accordingly, there is a need in the art for a user interface to improve user operability and convenience.

Korean Patent Application Laid-Open No. 10-2019-0131268 provides a system for customizing a fashion design.

SUMMARY OF THE INVENTION

The present disclosure is conceived in response to the background art, and has been made in an effort to provide a method of displaying design information.

According to an exemplary embodiment of the present disclosure for implementing the foregoing object, a computer program stored in a computer readable storage medium is disclosed. When the computer program is executed by one or more processors of a computing device, the computer program provides a user interface (UI) to display design information, and the user interface may include: a design group generation layer for generating a design group, and the design group generation layer includes one or more design file regions each of which are associated with a design file, and the design file region may include: a first sub region displaying a design image; and a second sub region displaying one or more design attribute objects, which allows user selection input for at least some of one or more design attributes included in the design file.

In an alternative exemplary embodiment of the user interface, the first sub region and the second sub region included in the design file region may be displayed alongside each other.

In the alternative exemplary embodiment of the user interface, the design group may be a data set which visualizes and displays information related to a designed article, and the design group may be generated to include design files for a design attribute corresponding to the user selection input, in response to the user selection input for at least some of the one or more design attribute objects.

In the alternative exemplary embodiment of the user interface, the user interface may further include design group region displaying that a design group including design files for a design attribute corresponding to the user selection input has been generated, in response to the user selection input for at least some of the one or more design attribute objects.

In the alternative exemplary embodiment of the user interface, the design file region may further include a third sub region displaying one or more design image attribute objects for changing the design image.

In the alternative exemplary embodiment of the user interface, the first sub region and the third sub region included in the design file region may be displayed alongside each other, or at least a part of the first sub region and the third sub region are overlapped.

In the alternative exemplary embodiment of the user interface, the one or more design image attribute objects may include at least one of a three-dimensional attribute object which displays the design image in three-dimension, a rendering attribute object which renders and displays the design image, a size attribute object which displays the design image differently according to a selected size, or a design feature attribute object which changes and displays a feature of the design image.

In the alternative exemplary embodiment of the user interface, the first sub region may change an attribute of the design image and additionally display the changed attribute of the design image, in response to a user selection input of design image attribute object of the third sub region.

In the alternative exemplary embodiment of the user interface, a feature of the design image may include at least one of color, texture, or material of the image.

In the alternative exemplary embodiment of the user interface, the design attribute object may be related to a design attribute for at least one of a design material and a design color.

In the alternative exemplary embodiment of the user interface, the second sub region may display a design attribute object corresponding to the user selection input among the one or more design attribute objects to be distinguished from another design attribute object.

In the alternative exemplary embodiment of the user interface, the second sub region may include: a predetermined number of design attribute objects; and an arrow object which identifies other design attribute objects.

In the alternative exemplary embodiment of the user interface, the design group may be related to at least one of a subject which identifies and generates design files included in the design group, time period when the design files are used, or design characteristics of the design files.

In the alternative exemplary embodiment of the user interface, the design group generation layer may further include one or more design group type selection objects, and the design group type selection object may be related to a method in which design files included in the design group are displayed.

In the alternative exemplary embodiment of the user interface, the design file may include information related to a designed article, and the design group generation layer may further include a design file addition object for adding a new design file in addition to the design file.

In the alternative exemplary embodiment of the user interface, the user interface may further include a design group layer including one or more design group design file regions each of which are related to a design group design file included in the design group, and the design group design file displays a generated design group, and the design group design file region may include: a first design group sub region displaying design image included in the design group design file; and a second design group sub region allowing user selection input for one or more design attributes included in the design group design file.

In the alternative exemplary embodiment of the user interface, the design group layer may further include an annotation region allowing a user annotation input in the design group design file.

In the alternative exemplary embodiment of the user interface, the first sub region may display a different visual expression on the design image according to the degree to which garment is fitted, in response to a user selection input for a fitting map object.

In the alternative exemplary embodiment of the user interface, the design group generation layer may include two or more design file regions, and the design group generation layer may change a display method of a design image displayed in remaining other design file regions correspondingly and displays the changed display method, in response to a user input for changing a display method of a design image displayed in one design file region among the two or more design file regions.

In the alternative exemplary embodiment of the user interface, the design group layer may include two or more design group design file regions, and the design group layer may change a display method of a design image displayed in remaining other design group design file regions correspondingly and display the changed display method, in response to a user input for changing a display method of design image displayed in one design group design file region among the two or more design group design file regions.

According to another exemplary embodiment of the present disclosure for implementing the foregoing object, a computer program stored in a computer readable storage medium is disclosed. When the computer program is executed by one or more processors of a computing device, the computer program provides a user interface (UI) to display design information, and the user interface may display a design group generation layer which generates a design group, and includes one or more design file regions each of which are associated with a design file, display a design image in a first sub region included in the design file region, and display one or more design attribute objects which allow a user selection input for at least some of one or more design attributes included in the design file in a second sub region included in the design file region.

According to another exemplary embodiment of the present disclosure for implementing the foregoing object, a method of providing design information by a user terminal is disclosed. The method may include: displaying design group generation layer generating a design group, and the design group generation layer includes one or more design file regions each of which are associated with a design file; displaying a design image in a first sub region included in the design file region; and displaying one or more design attribute objects in a second sub region included in the design file region, which allows user selection input for at least some of one or more design attributes included in the design file.

According to another exemplary embodiment of the present disclosure for implementing the foregoing object, a user terminal is disclosed. The user terminal may include: a processor including one or more cores; a memory; and an output unit providing a user interface. The user interface may include a design group generation layer for generating a design group, and the design group generation layer includes one or more design file regions each of which are associated with a design file, and the design file region may include: a first sub region displaying a design image; and a second sub region displaying one or more design attribute objects, which allows user selection input for at least some of one or more design attributes included in the design file.

According to another exemplary embodiment of the present disclosure for implementing the foregoing object, a server is disclosed. The server may include: a processor including one or more cores; a network unit; and a memory. The processor may determine to transmit a user interface (UI) to a user terminal through the network unit. The user interface may include a design group generation layer for generating a design group, and the design group generation layer includes one or more design file regions each of which are associated with a design file, and the design file region may include: a first sub region displaying a design image; and a second sub region displaying one or more design attribute objects, which allows user selection input for at least some of one or more design attributes included in the design file.

The present disclosure may provide a user interface displaying design information.

DETAILED DESCRIPTION

Figure 1:
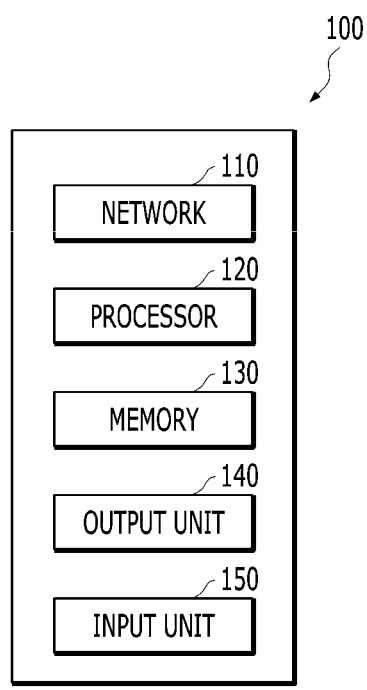
FIG. 1 is a block diagram illustrating a computing device that performs an operation for providing a user interface displaying design information according to an exemplary embodiment of the present disclosure.

Hereinafter, various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification are compatibly usable with one another and indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A. X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or addition of one or more other characteristics, constituent elements, and/or a group thereof is not excluded. Further, unless otherwise specified or when it is unclear that a single form is indicated in the context, the singular shall be construed to generally mean "one or more" in the present specification and the claims.

"Equal to or larger" and/or "less" and may be interpreted as "exceeding" and/or "equal to or less", and an interpretation vice versa is possible.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify the interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description of the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent with the principles and new characteristics presented herein.

FIG. 1 is a block diagram illustrating a computing device which performs an operation for providing a user interface displaying design information according to an exemplary embodiment of the present disclosure.

A computing device 100 performing an operation for providing a user interface displaying design information according to an exemplary embodiment of the present disclosure may include a network unit 110, a processor 120, a memory 130, an output unit 140, and an input unit 150.

The computing device 100 according to the exemplary embodiments of the present disclosure may include a Personal Computer (PC), a notebook computer, a mobile terminal, a smartphone, a table PC, and may include all kinds of terminal access to a wired/wireless network.

The network unit 110 may transceive data and the like for providing the user interface displaying design information according to the exemplary embodiment of the present disclosure with other computing devices, server, and the like.

The network unit 110 according to the exemplary embodiment of the present disclosure may be operated based on a currently used and implemented a predetermined form of wired/wireless communication technology, such as short-range (near field), remote, wired, and wireless communication technologies.

The processor 120 according to the exemplary embodiment of the present disclosure may be formed of one or more cores, and may include a processor, such as a Central Processing Unit (CPU), a General Purpose Graphics Processing Unit (GPGPU), and a Tensor Processing Unit (TPU) of the computing device, for providing the user interface displaying design information. The processor 120 may read a computer program stored in the memory 130 and provide the user interface displaying design information according to the exemplary embodiment of the present disclosure. At least one of the CPU, GPGPU, and TPU of the processor 120 may provide or generate a user interface displaying design information. For example, the CPU and the GPGPU may provide a user interface displaying design information together. Further, in the exemplary embodiment of the present disclosure, a user interface displaying design information may be provided by using the processors of the plurality of computing devices together. Further, the computer program executed in the computing device according to the exemplary embodiment of the present disclosure may be a CPU, GPGPU, or TPU executable program.

The memory 130 according to the exemplary embodiment of the present disclosure may store a predetermined form of information generated or determined by the processor 120 and a predetermined form of information received by the network unit 110.

According to the exemplary embodiment of the present disclosure, the memory 130 may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, and an optical disk. The computing device 100 may also be operated in association with a web storage which performs a storage function of the memory 130 on the Internet. The description of the memory is merely an example, and the present disclosure is not limited thereto.

The output unit 140 according to the exemplary embodiment of the present disclosure may display a predetermined User Interface (UI) for providing design information based on a user's selection. The output unit 140 may display user interfaces illustrated in FIGS. 2 to 6. The user interfaces illustrated and described below are merely an example, and the present disclosure is not limited thereto.

The output unit 140 according to the exemplary embodiment of the present disclosure may output a predetermined form of information generated or determined by the processor 120 and a predetermined form of information received by the network unit 110.

In the exemplary embodiment of the present disclosure, the output unit 140 may include at least one of a Liquid Crystal Display (LCD), a Thin Film Transistor Liquid Crystal Display (TFT LCD), an Organic Light Emitting Diode (OLED), a flexible display, and a 3D display. Among them, some of the display modules may be formed to be transparent or light-transmissive so that the outside can be seen through the display modules. The foregoing display module may be called a transparent display module, and a representative example of the transparent display module is a Transparent OLED (TOLED).

A user input may be received through the input unit 150 according to the exemplary embodiment of the present disclosure. The input unit 150 according to the exemplary embodiment of the present disclosure may be provided with keys and/or buttons for receiving a user input. According to the user input through the input unit 150, a computer program for providing design information based on a user's selection according to the exemplary embodiments of the present disclosure may be executed.

The input unit 150 according to the exemplary embodiments of the present disclosure may detect a button operation or a touch input of a user and receive a signal, or receive a voice or an operation of a user and the like through a camera or a microphone and convert the received signal or voice or operation into an input signal. To this end, speech recognition technology or motion recognition technologies may be used.

The input unit 150 according to the exemplary embodiments of the present disclosure may also be implemented by external input equipment connected with the computing device 100. For example, the input equipment may be at least one of a touchpad, a touch pen, a keyboard, and a mouse for receiving a user input, but is merely an example, and the present disclosure is not limited thereto.

The input unit 150 according to the exemplary embodiment of the present disclosure may recognize a user touch input. The input unit 150 according to the exemplary embodiment of the present disclosure may have the same configuration as that of the output unit 140. The input unit 150 maybe formed of a touch screen implemented so as to receive a selection input of a user. The touch screen may employ any one of a contact capacitive type, an infrared light sensing type, a surface ultrasonic wave (SAW) type, a piezoelectric type, and a resistive film type. The detailed description of the touch screen is merely an example according to the exemplary embodiment of the present disclosure, and various touch screen panels may be applied to the computing device 100. The input unit 150 formed of a touch screen may include a touch sensor. The touch sensor may be configured so as to convert a change in a pressure applied to a specific region of the input unit 150 or a change in a capacity generated in a specific region of the input unit 150 to an electric input signal. The touch sensor may be configured to detect the pressure of a touch, as well as a position and an area of a touch. When a touch is input to the touch sensor, a signal(s) corresponding to the touch input is transmitted to a touch controller. The touch controller processes the signal(s) and then transmits corresponding data to the processor 120. Accordingly, the processor 120 may recognize a touched region of the input unit 150 and the like.

In an exemplary embodiment of the present disclosure, a server may also include other configurations for performing a server environment of the server. The server may include any type of device. The server is a digital device and maybe a digital device, such as a laptop computer, a notebook computer, a desktop computer, a web pad, and a mobile phone, which is mounted with a processor, includes a memory, and has a calculation ability.

The server (not illustrated) performing an operation for providing a user terminal with the user interface displaying design information according to the exemplary embodiment of the present disclosure may include a network unit, a processor, and a memory.

The server may generate the user interfaces according to the exemplary embodiments of the present disclosure. The server may be a computing system providing a client (for example, a user terminal) with information through a network. The server may transmit the generated user interface to the user terminal. In this case, the user terminal may be a predetermined form of computing device 100 accessible to the server. The processor of the server may transmit the user interface to the user terminal through the network unit. The server according to the exemplary embodiments of the present disclosure may be, for example, a cloud server. The server may be a web server processing a service. The foregoing kind of server is merely an example, and the present disclosure is not limited thereto.

Each of the network unit, the processor, and the memory included in the server according to the exemplary embodiments of the present disclosure may be configured to perform the same roles as those of the network unit 110, the processor 120, and the memory 130 included in the computing device 100 or may be identically configured to the network unit 110, the processor 120, and the memory 130 included in the computing device 100.

In the exemplary embodiments of the present disclosure, a layer may mean a layer used for overlapping and displaying various images that are displayed in the user interface. Two or more layers may also be displayed while overlapping. When two or more layers are displayed while overlapping, one layer may be obscured by another layer and may not be visible. Otherwise, when two or more layers are displayed while overlapping and a part of an upper layer is semi-transparently displayed, at least a part of a lower layer may be visible. Two or more layers may have the same size. Otherwise, two or more layers may also have different sizes. The layer may include one or more regions. Otherwise, the layer may include one or more display objects.

In the exemplary embodiments of the present disclosure, the layer may be divided into a plurality of regions. The plurality of regions may be spaces that do not overlap on a screen. One layer may also include one region, or may also include a plurality of regions. One region may include one or more display objects.

In the exemplary embodiments of the present disclosure, the object may be a drawing, a symbol, or a set of characters corresponding to each of a program, a command, and data. The object according to the exemplary embodiment of the present disclosure may be used for receiving a user selection input. For example, when a user input for an object is received, the processor 120 may execute a command or data stored in accordance with the corresponding object and display the command or the data in the user interface. In the exemplary embodiments of the present, the object and the display object may be interpreted to have the same meaning.

In the exemplary embodiments of the present, the "display" may be an operation of displaying data to the user through the output unit 140. Herein, "display" and "display" may be exchangeably used.

Hereinafter, a method of providing a user interface displaying design information according to the exemplary embodiments of the present will be described.

Figure 2:
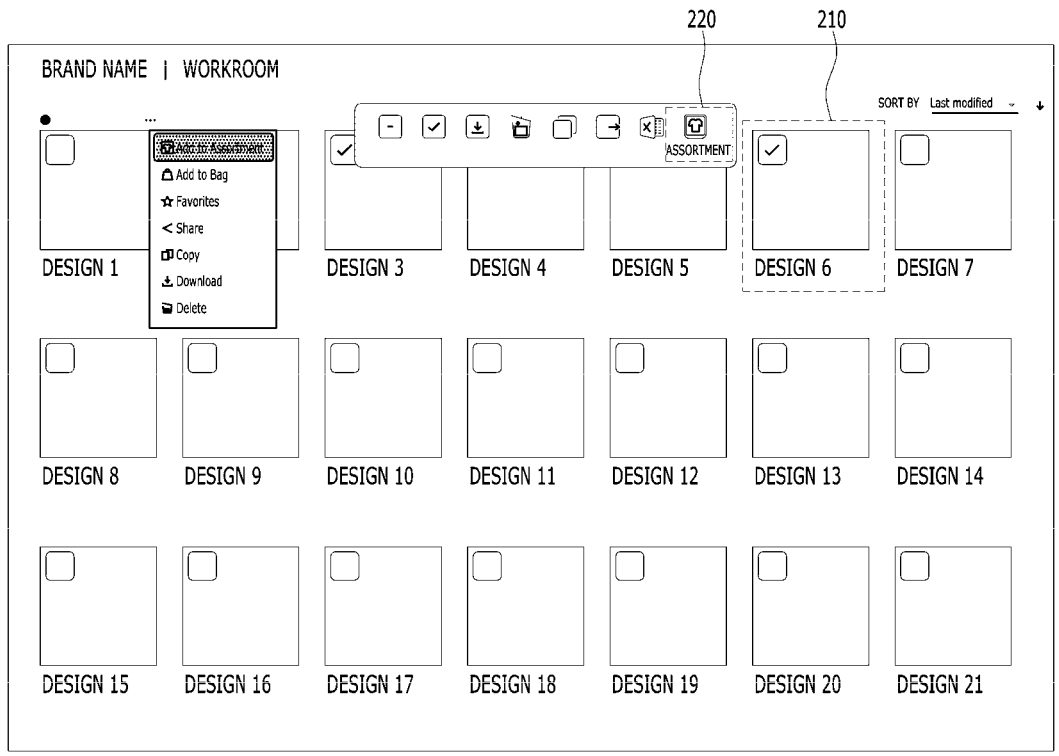
FIG. 2 is a diagram illustrating an example of a user interface displaying design information according to an exemplary embodiment of the present disclosure.

Hereinafter, a method of providing a user interface displaying design information will be described with reference to FIG. 2. FIG. 2 is a diagram illustrating an example of a user interface displaying design information according to an exemplary embodiment of the present disclosure. Hereinafter, a design file and a method of selecting a design file will be described.

The processor 120 may display objects 210 for one or more design files in a user interface. The user interface may include an object for one or more design files. The design file may include information related to a designed article. The design file may be a file including information related to an article designed by an article designing user (designer) by using an online program. One design file may be associated with the shape of one clothing. For example, one design file may be associated with a design for one type of dress. One design file may be associated with one or more materials or colors forming one type of dress. That is, one design file may include information indicating that the same type of dress may be expressed as a black wool dress, a black velvet dress, and a purple velvet dress. The information on the designed article may include a design image and one or more design data associated with the design image. For example, design file 1 maybe a file for a jacket. Design file 1 may include a design image for one or more jackets formed of one or more colors or materials. Otherwise, design file 1 may include one or more design data corresponding to each design image for one or more jackets. Design file 2 maybe a file to a T-shirt. The particular description for the design file is merely illustrative, and the present disclosure is not limited thereto.

The design image may be a virtualized image of a designed article. The designed article may not be limited to a specific item and may comprehensively refer to all articles that can be designed. For example, a user (designer) designing clothing may design digitalized clothing. Virtualized sample clothing completed according to the design of the clothing online may be a clothing image. Further, for example, the design image may be an image obtaining by designing and virtualizing clothing, a curtain, shoes, a bag, and the like. Further, for example, the design image may be an image obtained by designing and virtualizing furniture, toys, and the like. For example, a gray top and jeans illustrated in FIG. 2 may be an image of clothing that is virtualized sample clothing completed according to the design of the clothing. The particular description for the design image is merely illustrative, and the present disclosure is not limited thereto.

One or more design data associated with the design image may be data required for generating a design corresponding to the design image. The design data may be data required for producing a virtualized sample article in an actual process. The design data may be data about at least one of a color, a pattern, a material, a subsidiary material, or a size of each of them of an article required for producing the article. The pattern may mean cutting at least a part of the article. For example, the pattern may mean a flat cut for each of the front, back, and sleeve parts that makeup a T-shirt. The material may mean the raw material of the article. For example, in the case of clothing, the material may mean cotton, wool, velvet, and the like. The subsidiary material may be a material auxiliary used to construct the article. For example, a material mainly used for forming the clothing may be fabric, and the auxiliary used subsidiary material may be buttons, logos, zippers, and the like. The size may be a value for explaining a material or a subsidiary material used for constructing the article. For example, the size may be a length of each corner of a pattern, a diameter of a button, and the like for describing a pattern. For example, the design data may be data for one or more colors or materials for making T-shirts having the same shape, four patterns constructing the T-shirt, the material constructing each part of the T-shirt, buttons, and logos attached to the T-shirt, and a size or a length of each of them. The particular description for the design data is merely illustrative, and the present disclosure is not limited thereto.

The processor 120 may receive the design files through the network unit 110. Otherwise, the processor 120 may read the design files stored in the memory 130. The design file may include data generated through an article design program.

The processor 120 may receive a user selection input for at least some of the design files among the objects 210 for one or more design files displayed in the user interface. The user selection input for at least some of the design files may be the input for selecting some design files for generating a design group among the plurality of design files. The designers may design a plurality of articles. The designer may select some articles among the plurality of designed articles and select a design group. The user may generate the design group using some design files by selecting at least some of the design files among the plurality of design files.

The design group may be a data set that visualizes and displays information related to the designed article. The design group may be a data file that selects and displays only a part of the plurality of work products (that is, the design files) of the designer. For example, among the plurality of work products designed by the designer, the designer may generate a design group of Brand A by selecting some work products to be proposed to the company of Brand A, or may also generate a design group of season B by selecting some work products to be proposed to the company of Brand A for season B. The particular description for the design group is merely illustrative, and the present disclosure is not limited thereto.

The design group may be associated with at least one of a subject that identifies and generates design files included in the design group, the time period for which the design files included in the design group are used, and design characteristics of design files included in the design group. The subject which identifies and generates design files may include subjects included in an article producing process. All of the subjects included in the article producing process may be, for example, a designer designing clothing, a vendor company that includes designers who design clothing, a clothing brand company, a clothing manufacturing company, and a factory that manufactures clothing. For example, the design group may also be associated with the last available order date, contact information, delivery information, and the like determined by the subjects which identify the design file. The subject which identifies or generates the design files may be associated with retailer information. For example, information about the brand company of Country A, the brand company of Country B, and a pop-up store of New York, and a pop-up store of Toronto may be associated with the design group. The period for which the design files are used maybe a producing season of the article. For example, the period for which the design files are used may be Spring-Summer (SS season) 2020, and March 2020. The design characteristics of the design files may be associated with, for example, class, gender, age, style, type of clothing (for example, knit, skirt), type of pattern (for example, check pattern, argyle pattern), a material of the fabric, color or texture, size, size range, number of predetermined styles (for example, style number 1 for a floral style), and standard color numbers used in the industry. The design characteristic may be transmitted with, for example, a 2D image of the design file, a 3D image of the design file, a fitting map, a photo, or a text description. For example, the design group for the argyle pattern may be transmitted to each of the companies of Brands A. B, and C. For example, a design group for size 46 that is a big woman's size may be generated and transmitted to a big size clothing producing companies. For example, a design group including the design files corresponding to a blue color may also be generated. The design group may also be generated for each price of the design files. For example, a first design group may include design files for low-price clothing, and a second design group may also include design files for high-price clothing. In the design group, the minimum order quantity, an order available date, a contact address, an actual photo of a sample may be stored while corresponding to the design group. The particular description for the design group is merely illustrative, and the present disclosure is not limited thereto.

The processor 120 may receive a user selection input for at least some of the design files among the objects 210 for one or more design files displayed in the user interface. The processor 120 may differently display the object for the design file corresponding to the user selection input and the objects for the remaining design files. The user interface may include a layer differently displaying the object for the design file corresponding to the user selection input and the objects for the remaining design files in response to the user selection input for at least some of the design files among the objects 210 for the one or more design files. For example, the differently displaying the two or more objects may be differently displaying colors, additional marks, shadows, and boundaries for the two or more objects, but the present disclosure is not limited thereto. FIG. 2 illustrates the user interface in which a check indication object is displayed while overlapping the design file object corresponding to the user selection input. The particular description for the design file selection is merely illustrative, and the present disclosure is not limited thereto.

The processor 120 may receive a user input for an assortment object 220. The user interface may include an assortment object 220. The processor 120 may receive a user input for the assortment object 220 after receiving the user selection input for at least some of the design files. The assortment object 220 may be a display object determining at least some of the design files as the design files for generating a design group.

The processor 120 may group at least some of the design files to one assortment group. The assortment group may be the group of design files which is the basis of the generation of the design group. That is, the user may select a part of the design work products among the plurality of design work products and generate the assortment group. Further, the user may select a part of the design work products among the plurality of design work products included in the assortment group and generate the assortment group. The user may also select only colors or materials for design work products included in the assortment group and generate the design group. The particular description for the assortment is merely illustrative, and the present disclosure is not limited thereto.

The processor 120 may receive a selection of at least some of the design files in a list of the currently used or generated design files and include the selected design files in the assortment group. Otherwise, the processor 120 may receive a selection of at least some of the design files in a list of the design files stored in a specific path and include the selected design files in the assortment group. For example, the processor 120 may receive a selection of at least some of the design files in a currently generated design file list of a first operator and generate the assortment group. The first operator may be an operator who is the same as or different from the operator generating the assortment group. The particular description for the generation of the assortment group is merely illustrative, and the present disclosure is not limited thereto.

The processor 120 may make a change so that at least some of the design files among the design files included in a first assortment group are included in a second assortment group. Otherwise, the processor 120 may also include at least some of the design files among the design files included in the first assortment group in the second assortment group. For example, the processor 120 may make a change so that the design files included in an assortment group of the F/W season are included in an assortment group of the S/S season. Otherwise, for example, the processor 120 may also include a design file included in an assortment group for a first vendor in an assortment group for a second vendor. The particular description for the generation of the assortment group is merely illustrative, and the present disclosure is not limited thereto.

Figure 3:
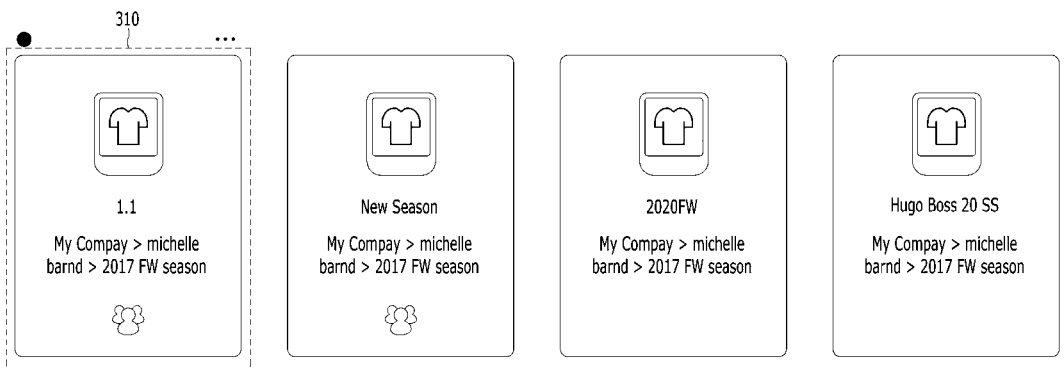
FIG. 3 is a diagram illustrating an example of a user interface displaying design information according to an exemplary embodiment of the present disclosure.

The processor 120 may designate a name to the assortment group including at least some of the design files after receiving the user input for the assortment object. The assortment group will be described with reference to FIG. 3 below. FIG. 3 is a diagram illustrating an example of a user interface displaying design information according to an exemplary embodiment of the present disclosure. The user interface may include an object inputting a name for an assortment group after the assortment group is generated. Each assortment group may be associated with at least one of a subject that identifies and generates design files included in the assortment group, the time period for which the design files are used, and the design characteristics of design files. The particular descriptions for the subject, the time period, and the design characteristic may be construed to be the same as the examples of the subject, the time period, and the design characteristic for the design group.

The processor 120 may store one or more assortment groups in the memory 130. The processor 120 may display an assortment group object 310 for a user selection input for the plurality of assortment groups. The user interface may include one or more assortment group objects 310. Each of the assortment group objects 310 may be a display object associated with the assortment group.

The processor 120 may display the assortment group object 310 related to an assortment group stored by the user and each of the assortment groups received (shared with) from another user. The user interface may include the assortment group object 310 related to an assortment group stored by the user and each of the assortment groups received from another user. That is, the user may also use the assortment group generated by himself/herself, or share the generated assortment group with another user.

The processor 120 may display the assortment group objects 310 associated with a user accessible assortment group. The user interface may include the assortment group objects 310 associated with the user accessible assortment group by receiving the assortment group generated by the user or shared from another user. The processor 120 may receive a user input for the assortment group object 310. The processor 120 may display a design group generation layer 400 including the design files included in the assortment group corresponding to the assortment group object 310. The user interface may further include a design group generation layer 400 including the design files included in the assortment group in response to the reception of the user input for the assortment group object 310. The design group generation layer will be described below.

Figure 4:
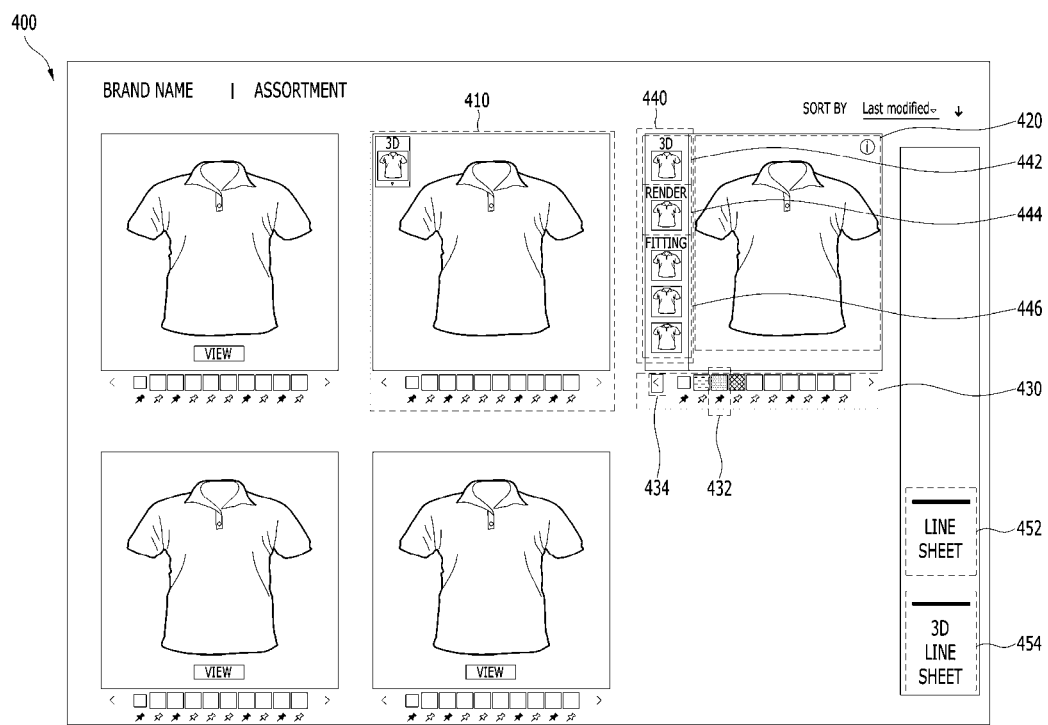
FIG. 4 is a diagram illustrating an example of a user interface displaying design information according to an exemplary embodiment of the present disclosure.
Figure 5:
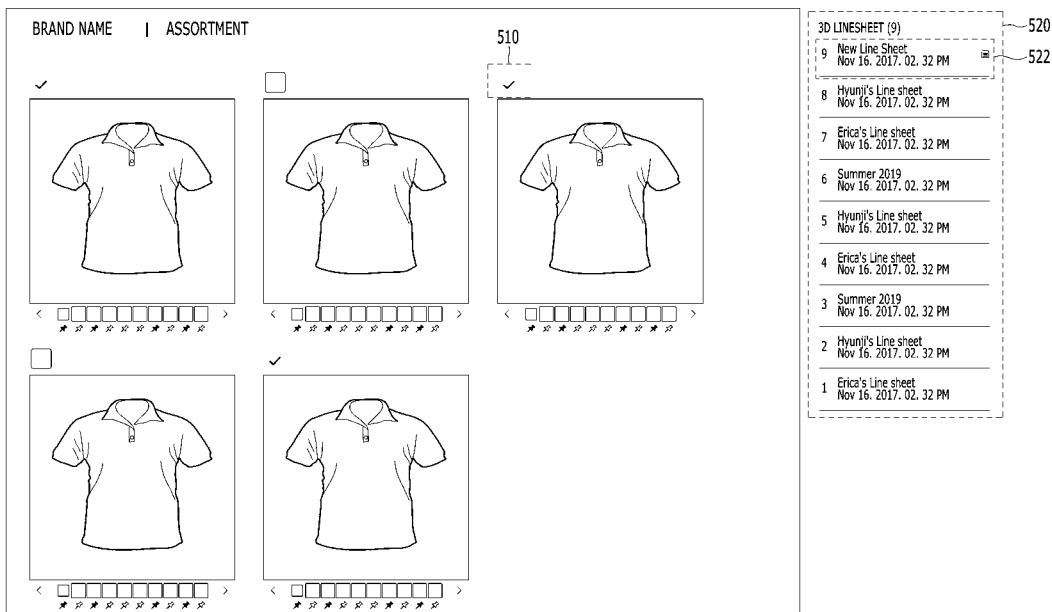
FIG. 5 is a diagram illustrating an example of a user interface displaying design information according to an exemplary embodiment of the present disclosure.
Figure 6:
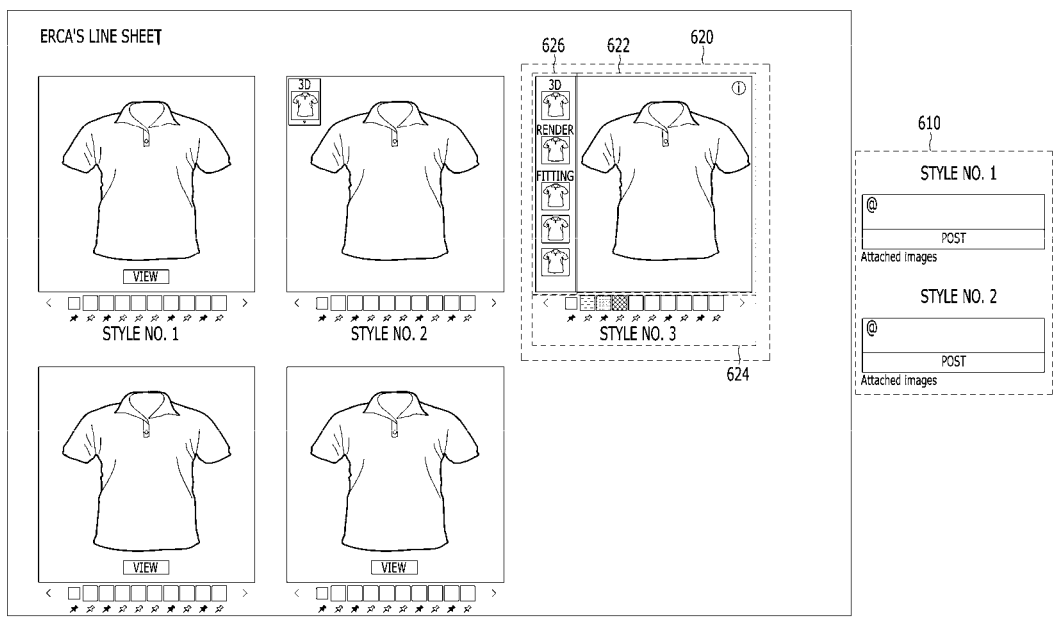
FIG. 6 is a diagram illustrating an example of a user interface displaying design information according to an exemplary embodiment of the present disclosure.

Hereinafter, a method of generating the design group will be described with reference to FIGS. 4 and 5. FIGS. 4 and 5 are diagrams illustrating examples of user interfaces displaying design information according to exemplary embodiments of the present disclosure. The shapes of the designs illustrated in FIGS. 4 to 6 are merely illustrative, and even though the designs are the same, the designs may be constructed as different designs. FIGS. 4 and 5 are diagrams illustrating examples of the design group generation layer 400 generating a design group. The design group generation layer 400 may include the design files included in the assortment group. A design group may be generated by selecting at least some of the design files among the design files included in the design group generation layer 400. Otherwise, a design group may be generated by selecting colors or materials corresponding to the design files included in the design group generation layer 400.

The processor 120 may display the design group generation layer 400. The user interface may include the design group generation layer 400. The design group generation layer 400 may be the layer displayed in the user interface for generating a design group. The design group generation layer 400 may include one or more design file regions 410 associated with each of the design files.

The processor 120 may display one or more design file regions 410 associated with one or more design files included in one assortment group, respectively. The user interface may include one or more design file regions 410. The number of design files included in the assortment group may be the same as the number of design file regions 410 included in the user interface.

Figure 7:
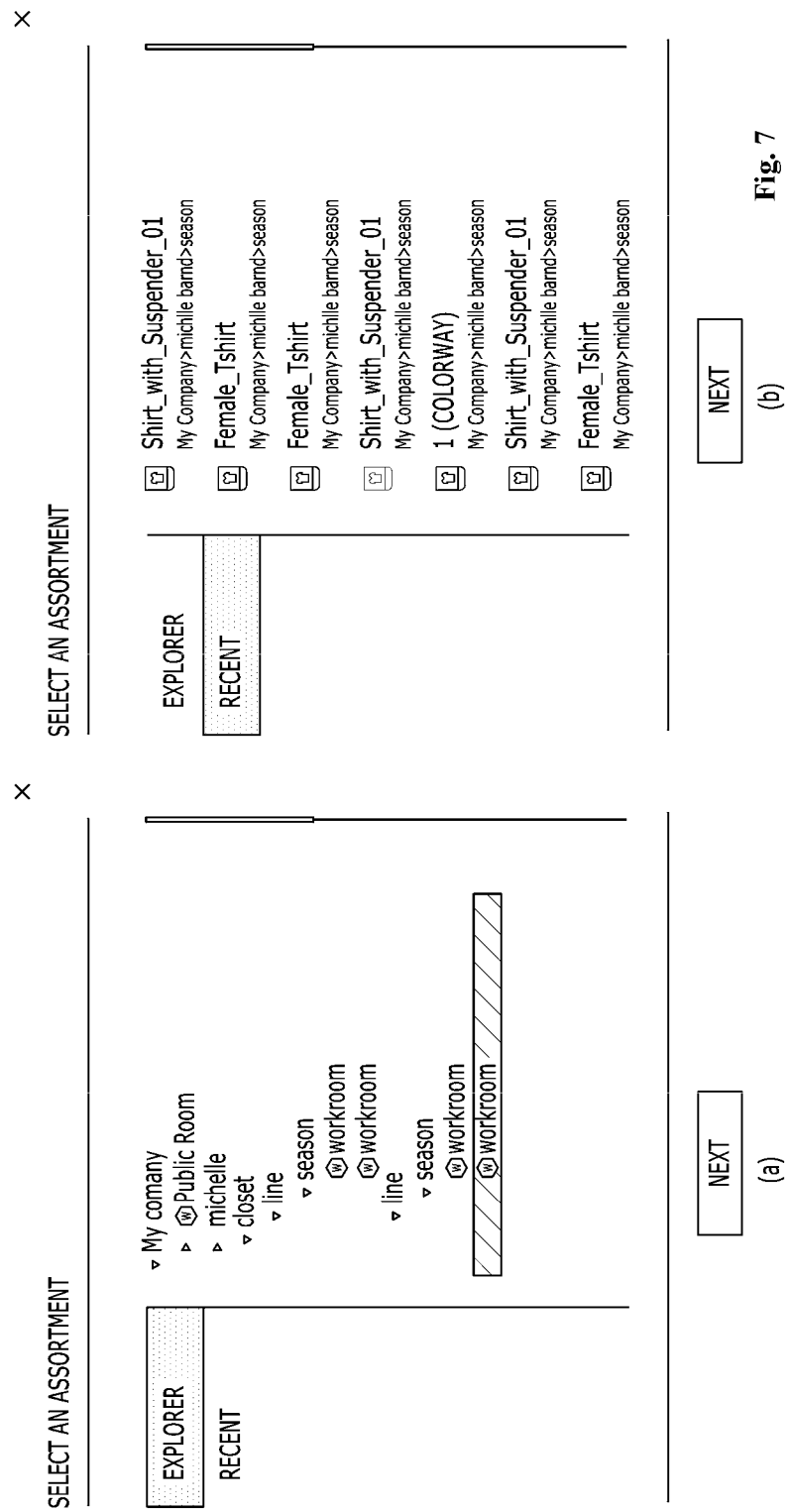
FIG. 7 is a diagram illustrating an example of a user interface displaying design information according to an exemplary embodiment of the present disclosure.

The user interface may include the design group generation layer 400. The design group generation layer 400 may include a design file adding object which adds a new design file in addition to an existing design file. Hereinafter, the description will be given with reference to FIG. 7. The processor 120 may receive a user selection input for a design file adding object. The processor 120 may display other design files, which are not included in the assortment group, in response to the user selection input for the design file adding object. The user interface may further include a new layer including other design files, which are not included in the assortment group. The processor 120 may receive a user selection input for at least some of the design files among other design files, which are included in the new layer but are not included in the assortment group. The processor 120 may newly add a part of the design files corresponding to the user selection input to the assortment group. The processor 120 may newly generate design file regions 410 related to the newly added design files and display the generated design file regions 410. For example, the processor 120 may receive a user selection input for at least some of the design files in the list of the currently used design files through a user interface illustrated in (b) of FIG. 7. Otherwise, for example, the processor 120 may shift the design files included in another assortment group to a corresponding assortment group or include the same design file in the corresponding assortment group through a user interface illustrated in (a) of FIG. 7. The processor 120 may include the design file according to the user selection input to the assortment group. The particular description for the addition of the design file is merely illustrative, and the present disclosure is not limited thereto.

The design file region 410 may include a first sub region 420, a second sub region 430, and a third sub region 440. However, this is merely illustrative, and according to other exemplary embodiments, other sub regions may also be added to the design file region 410, and at least a part of the sub regions among the sub regions may not be included.

The first sub region 420 may include a design image. The processor 120 may display a design image included in each of the one or more design files included in the assortment group. The first sub region 420 may be used for displaying a thumbnail for the design file. The first sub region 420 may display an image obtained by converting the design image included in the design file in a smaller size. That is, the design image is displayed in the first sub region 420 to enable the user to easily check information about the design file.

The first sub region 420 may include a design image displayed according to a predetermined design image attribute. The design image attribute may be a method of displaying the design image. The design image attribute may include at least one of an attribute displaying the design image two-dimensionally, an attribute displaying the design image three-dimensionally, an attribute displaying the design image in a video, and an attribute displaying the design image in specific texture, color, or material. For example, the first sub region 420 may display a two-dimensional design image according to a predetermined design image attribute. The design image attribute of the first sub region 420 may be changed according to a user input. An operation of changing the design image attribute will be described below. That is, the first sub region 420 may display a default design image according to a predetermined design image attribute. The default design image may be changed according to a user input.

The third sub region 440 may include one or more design image attribute objects 442, 444, and 446 changing the design image. The design image attribute may be the method of displaying the design image as described above. The design image attribute objects 442, 444, and 446 may include a three-dimensional attribute object 442 which displays the design image three-dimensionally. The three-dimensional attribute object 442 may be formed of a three-dimensional thumbnail image for the design image. The design image attribute objects 442, 444, and 446 may include a rendering attribute object 444 which renders and displays the design image. The rendering attribute object 444 may be formed of a short video or a still image of the rendered design image. That is, the processor 120 may display a result of the two-dimensional or three-dimensional rendering, in which the design image is implemented, in the user interface. The design image attribute objects 442, 444, and 446 may include a size attribute object 446 which differently displays the design image according to a selected size. The size attribute object 446 may be the display object for receiving a selection input for one size between two or more sizes. For example, the size attribute object 446 may also be the display object for changing at least one of the size of clothing displayed with the design image and a size of an avatar fitting the clothing. For example, the size attribute object 446 may be the display object for changing a size of the clothing to size 0, size 1, or size 2 and displaying the changed size. Otherwise, for example, the size attribute object 446 may be the display object for changing a size of an avatar fitting the clothing to size 0, size 1, or size 2 and displaying the changed size. The design image attribute objects 442, 444, and 446 may include a design feature attribute object which changes a feature for the design image and displaying the changed feature. The design feature attribute may be an attribute for at least one of a color, texture, and the material of the design. For example, a first design feature attribute object may correspond to a black design and a second design feature attribute object may correspond to a white design. Otherwise, for example, a third design feature attribute object may correspond to yarn 50 and a fourth design feature attribute object may correspond to yarn 100. Otherwise, for example, a fifth design feature attribute object may correspond to yarn velvet, and a sixth design feature attribute object may correspond to jeans. The particular description for the design image attribute object is merely illustrative, and the present disclosure is not limited thereto.

The first sub region 420 may include the design image including the changed attribute in response to the user selection input for the design image attribute objects 442, 444, and 446 of the third sub region 440. The processor 120 may receive the user selection input for the design image attribute objects 442, 444, and 446 of the third sub region 440. The processor 120 may change the design image of the first sub region 420 to correspond to the design image attribute objects 442, 444, and 446 selected by the user and display the changed design image. For example, the design image attribute objects 442, 444, and 446 selected and input by the user may be the three-dimensional attribute object 442. The processor 120 may change the design image of the first sub region 420 to the three-dimensional design image and display the changed three-dimensional design image. The first sub region 420 may include the three-dimensionally changed design image. For example, the first sub region 420 may include a two-dimensional design image designated as a default attribute. The first sub region 420 may additionally include the design image which is changed from the two-dimensional image to the three-dimensional image in response to the user selection input. The first sub region 420 may include the design image in which the size of the design image or the size of the avatar fitting the design image is changed in response to the user selection input for the size attribute object 444. The particular descriptions for the design image attribute object and the design image are merely illustrative, and the present disclosure is not limited thereto.

That is, the user may check the design attributes or the design characteristics of the design files included in the assortment group through the design image of the first sub region 420. The user may check a virtualized design image at various angles or having various attributes while changing the attribute of the design image included in the first sub region 420 through the selection input for the design image attribute objects 442, 444, and 446 included in the third sub region 440. The user may check the virtualized design sample at various angles through the three-dimensional design image included in the first sub region 420. Otherwise, the user may check a virtualized design sample in which at least one of the corresponding color, texture, and material is applied through the design image, in which at least one of the color, the texture, and the material is changed, included in the first sub region 420. The user may select the design attributes suitable to the attribute of the design group desired to be generated by checking the virtualized design samples. The particular descriptions for the design image attribute object and the design image are merely illustrative, and the present disclosure is not limited thereto.

The second sub region 430 may include one or more design attribute objects 432. The design attribute object 432 may be associated with a design attribute for at least one of a design material and a design color. One design file may include an article design of one shape. One design file may include one or more design attributes. One design file may include a plurality of colors or pattern attributes for the article design of one shape. For example, one design file may include a color attribute corresponding to each of the beige, black, and navy colors for one jacket shape. The processor 120 may display the design attribute object 432 corresponding to each of the plurality of design attributes included in one design file. The particular description for the design attribute object is merely illustrative, and the present disclosure is not limited thereto.

The second sub region 430 may include one or more design attribute objects 432 allowing the user selection input for at least some of the design attributes among one or more design attributes included in the design file. The assortment group may include one or more design files. Each of the one or more design files may include one or more design attributes. The user may need to generate a design group to include only at least some of the design attributes among the plurality of design attributes as necessary. For example, the design attributes corresponding to the clothing designed by the user may include a wool material, a cashmere material, and an acrylic mixed material. Since brand A is a low-price brand, the user may want to generate a design group by configuring a design file to include only an acrylic mixed material and a wool material. In this case, the processor 120 may receive a user selection input only for a wool material design attribute object and an acrylic mixed material design attribute object among the wool material design attribute object, the cashmere material design attribute object, and the acrylic mixed material design attribute object. Otherwise, for example, the design attributes corresponding to the clothing designed by the user may include black, white, blue, and beige colors. The user may want to generate a design group by configuring a design file to include only black and beige colors that fit the 2020 fall season. The processor 120 may receive a user selection input for the design attribute objects 432 corresponding to black and beige colors among the design attribute objects 432 corresponding to the four colors. The particular description for the design attribute object is merely illustrative, and the present disclosure is not limited thereto.

The second sub region 430 may include the predetermined number of design attribute objects 432. The second sub region 430 may include an arrow object 434. The number of design attributes included in the design file may be larger than the predetermined number of design attributes. When more design attribute objects 432 than the predetermined number are displayed in the second sub region 430, it may be difficult for the user to visually check the design attribute objects 432. Accordingly, only the predetermined number of design attribute objects 432 may be displayed in the second sub region 430. When the processor 120 receives a user selection input for the arrow object 434, the processor 120 may replace at least some of the design attribute objects among the existing design attribute objects displayed with another design attribute objects and display the replaced design attribute objects. That is, the user may intuitively recognize that through the selection input for the right arrow object, the displayed design attribute objects will be moved one by one to the left and displayed and a new design attribute object will be displayed on the rightmost side. The particular description for the second sub region is merely illustrative, and the present disclosure is not limited thereto.

The second sub region 430 may include display objects in which the design attribute object corresponding to the user selection input and other design attribute objects are differently displayed. The processor 120 may distinguish and differently display the design attribute object corresponding to the user selection input included in the second sub region 430 and other design attribute objects. For example, differently displaying the two or more objects may be differently displaying colors, additional marks, shadows, and boundaries for the two or more objects, but the present disclosure is not limited thereto. FIG. 4 illustrates an example in which two or more objects are distinguished and displayed. For the design attribute object corresponding to the user selection input, the processor 120 may display a pin object displayed at a lower end with a white color. For the remaining design attribute objects, the processor 120 may display a pin object displayed at the lower end with a gray color. The particular description for the design attribute object is merely illustrative, and the present disclosure is not limited thereto.

The first sub region 420 may include an avatar on/off an/the object. The first sub region 420 may display or may not display an avatar as a response to a selection input for the avatar on/off an/the object. That is, the first sub region 420 may display the avatar wearing designed clothing that is the design image in response to the selection input for the avatar on/off an/the object. Otherwise, the first sub region 420 may also delete the avatar in response to the selection input for the avatar on/off an/the object, and display only designed clothing that is the design image. For example, in the case where the design image is three-dimensionally displayed as the display method, the user may quickly intuitively understand the clothing when checking the clothing while the avatar is wearing the clothing. In this case, the avatar wearing the clothing may be checked in response to the selection input for the avatar on/off an/the object. The particular description for the first sub region is merely illustrative, and the present disclosure is not limited thereto.

The first sub region 420 may include a design on/off an/the object. The first sub region 420 may display or may not display the design image as a response to a selection input for the design on/off an/the object. The particular description for the first sub region is merely illustrative, and the present disclosure is not limited thereto.

The first sub region 420 may include a fitting map object. The fitting map object may be a display object for displaying different visual expressions on the design image according to the degree in which the clothing is fitted to the design image. The processor 120 may display a fitting map on the design image in response to a user selection input for the fitting map object. That is, the fitting map object may be used as an on/off display object for displaying or not displaying the fitting map. The processor 120 may display or may not display the fitting map in the first sub region 420 in response to the user selection input for the fitting map object. The fitting map may be information that visually displays information on how much the clothing clings to the body or how much the clothing is loose when the designed clothing is worn by a person in the design image. In the fitting map, for example, when a waist portion of the T-shirt fits to the body, the waist portion is displayed in blue, and when the arm portion of the T-shirt does not fit to the body and is large, the arm portion may be displayed in yellow. The processor 120 may differently display the color of the clothing according to the degree in which the clothing fits to the body, and differently display the intensity of the color. The processor 120 may display the different fitting map in the first sub region 420 according to a user selection input for the size attribute object 446 included in the third sub region 440. For example, when the clothing corresponding to size 36 and size 38 is worn by the avatars of the same size, the degree to which the clothing fits to the body may be different. The processor 120 may display the different fitting maps according to the size of the size attribute object 446 for which the user selection input is made. The particular description for the fitting map is merely illustrative, and the present disclosure is not limited thereto. The first sub region 420 and the second sub region 430 may be disposed alongside each other. In the exemplary embodiments of the present disclosure, the disposition of the two regions alongside each other may include the case where the two regions are adjacently disposed. The disposition of the two regions alongside each other may include the case where the two regions are disposed while having a predetermined interval between the two regions. The first sub region 420 and the second sub region 430 may be disposed while at least a part of the first sub region 420 overlaps at least a part of the second sub region 430. At least a part of the first sub region 420 overlaps at least a part of the second sub region 430, so that the corresponding portion of the second sub region 430 may be hidden. Otherwise, the first sub region 420 and the second sub region 430 may be displayed vice versa. The first sub region 420 may display the design image for the design file. The second sub region 430 may include a design attribute object explaining one or more design attributes related to the design images included in the first sub region 420. For example, the first sub region 420 and the second sub region 430 may be disposed so that at least a part of the region included in the first sub region 420 is adjacent to at least a part of the region included in the second sub region 430. For example, the first sub region 420 and the second sub region 430 may be disposed alongside each other vertically or horizontally. By disposing the design image and the design attributes alongside each other, the user may intuitively understand the user interface for selecting the corresponding design attribute.

The first sub region 420 and the third sub region 440 may be disposed alongside each other. The design image included in the first sub region 420 may be changed and displayed in response to a selection input for the design image attribute object included in the third sub region 440. That is, according to the image attribute change in the left third sub region 440 disposed alongside each other, the image in the right first sub region 420 may be changed. For example, the first sub region 420 and the third sub region 440 may be disposed so that at least a part of region included in the first sub region 420 is adjacent to at least a part of the region included in the third sub region 440. For example, the first sub region 420 and the third sub region 440 may be disposed alongside each other vertically or horizontally. By disposing the objects changing the image attribute and the image changed according to the objects alongside each other, the user may intuitively understand the user interface for selecting the corresponding design attribute.

The design group generation layer 400 may include two or more design file regions 410. When an input of the user for one design file region among two or more design file regions 410 is received, one design file region input by the user may be enlarged and displayed large. For example, when the processor 120 recognizes that a mouse pointer is located in one design file region, the processor 120 may enlarge the corresponding design file region and display the enlarged design file region in the user interface. The processor 120 may enlarge one design file region and display the enlarged design file region in an upper layer of the design group generation layer 400. In the upper layer, a portion including the design file region is opaquely displayed and the remaining portions are semi-transparently displayed, so that some of the design file regions included in the design group generation layer may be shown through the semi-transparent portion. The particular description for the operation of enlarging and displaying the design file region is merely illustrative, and the present disclosure is not limited thereto.

The processor 120 may receive a selection input for at least some of the design file regions among one or more design file regions. The processor 120 may differently display (510) the design file regions so that at least some part of the design file regions corresponding to the user selection input is distinguished from the remaining design file region. The user interface may include the different display (510) of the design file region selected by the user and the remaining design file regions in response to the user selection input for the at least some of the design file regions among one or more design file regions. For example, displaying the two or more regions differently may be displaying colors, additional marks, shadows, borders and the like of the two or more regions differently, but the present disclosure is not limited thereto. FIG. 5 illustrates the user interface in which a check object is additionally displayed (510) for a design file region selected by a user according to the exemplary embodiment of the present disclosure. The description for the design file region is merely illustrative, and the present disclosure is not limited thereto.

According to the exemplary embodiment of the present disclosure, the processor 120 may generate a design group to include only a design file corresponding to a user selection input. The processor 120 may generate a design group to include at least some of the design files selected by a user among the plurality of design files.

According to the exemplary embodiment of the present disclosure, the processor 120 may generate a design group to include only a design attribute and a design file corresponding to a user selection input. The processor 120 may generate a design group to include at least some of the design files selected by a user among the plurality of design files. Otherwise, the processor 120 may generate a design group to include at least some of the design attributes selected by a user among at least some of the design files selected by the user.

The user interface may include one or more design group type selection objects 452 and 454. The processor 120 may display one or more design group type selection objects 452 and 454. The design group type selection objects 452 and 454 may be associated with the method of displaying the design files included in the design group. The first design group type selection object 452 may correspond to the two-dimensional display of the design files included in the design group. The second design group type selection object 454 may correspond to the three-dimensional display of at least some of the design files included in the design group. When the processor 120 receives a user input for the first design group type selection object 452, the processor 120 may generate a design group to include the design files of the two-dimensional form. The processor 120 may generate a downloadable design group in response to the user input for the first design group type selection object 452. For example, the processor 120 may generate a design group in the format of Excel and Word file in response to the user input for the first design group type selection object 452. When the processor 120 receives a user input for the second design group type selection object 454, the processor 120 may generate a design group to include at least some of the design files in the two-dimensional form. For example, the processor 120 may provide another user with a link through which the corresponding design group may be shared in response to the user input for the second design group type selection object 454. The design group generated in response to the user input for the second design group type selection object 454 will be described again below with reference to FIG. 6. The particular description for the selection of the type of design group is merely illustrative, and the present disclosure is not limited thereto.

According to the exemplary embodiment of the present disclosure, the processor 120 may generate a design group in response to the user selection input for at least some of the one or more design attribute objects 432. The design group may include the design files for the design attribute corresponding to the user selection input. As described above, the processor 120 may generate a design group including the design files including only at least some of the design attribute objects 432 selected and input by the user among the plurality of design attribute objects 432. That is, referring to FIG. 4, for example, in the design attribute object 432 selected by the user, the color of the pin may be changed to black. That is, in the design attribute which is not selected and input by the user, the color of the pin may be displayed in white, and in the design attribute which is selected and input by the user, the color of the pin may be displayed in black. The processor 120 may determine the design files including only the design attributes corresponding to the black pin. For example, the processor 120 may include some fabrics selected by the user among the plurality of fabric in the design group. The processor 120 may generate the design group including the corresponding design files. The particular descriptions for the design attribute and the design group are merely illustrative, and the present disclosure is not limited thereto.

According to the exemplary embodiment of the present disclosure, the processor 120 may generate a design group in response to the user selection input for at least some of the one or more design attribute objects 432 and the design group selection objects 452 and 454. The design group may include the design files for the design attribute corresponding to the user selection input. The design group may include the design files displayed in the format corresponding to the user selection input.

Hereinafter, the design group will be additionally described with reference to FIG. 5. FIG. 5 is a diagram illustrating an example of a user interface displaying design information according to an exemplary embodiment of the present disclosure.

A user interface may include a design group region 520. The design group region 520 may include an indication indicating that a design group is generated. The design group region 520 may include an indication indicating that a design group including design files for a design attribute corresponding to the user selection input is generated in response to the user selection input for at least some of the design attribute objects among one or more design attribute objects. The processor 120 may generate the design group and display that the new design group is generated in the design group region 520.

The design group region 520 may include a list of the generated design groups. The design group region 520 may include a list of design groups arranged in a predetermined order. A design group displayed at the top in the list included in the design group region 520 may be the most recently generated design group. The processor 120 may display the most recently generated design group at the topmost end of the design group region 520. The processor 120 may designate a design group name according to a user input. The design group name may also include information on at least one of a subject, a time period, or a design characteristic associated with the design group as described above. The particular description for the design group is merely illustrative, and the present disclosure is not limited thereto.

Hereinafter, a design group will be described with reference to FIG. 6. FIG. 6 is a diagram illustrating an example of a user interface displaying design information according to an exemplary embodiment of the present disclosure. FIG. 6 is a diagram illustrating an example of a design group layer displaying a generated design group.

A user interface may include a design group layer. The design group layer may be the layer displaying the generated design group. The design group layer may include information related to the design files included in the design group. The design group layer may include information related to the design files determined to be included in the design group by a user.

The design group layer included in the user interface may include one or more design group design file regions 620. The design group design file region 620 may be associated with each design group design file included in the design group. The design group design file regions 620 may include design information included in the design group design file included in the design group.

The design group design file regions 620 included in the design group layer may be partially similar to the design file region 410 included in the design group generation layer. The design file region 410 may display information about the design files included in the assortment group. The design group design file regions 620 may display information about at least some of the design files selected among the design files included in the assortment group. The design group design file regions 620 may display information about the design files including at least some of the design attributes selected among the design files included in the assortment group. That is, the design group design file regions 620 included in the design group layer and the design file region 410 included in the design group generation layer may include partially different design information, but may similarly express the design information.

The design group design file regions 620 may include a first design group sub region 622, a second design group sub region 624, and a third design group subregion 626. However, this is merely an example, and according to other exemplary embodiments, other sub regions may also be added to the design group design file regions 620, or at least a part of the sub regions among the sub regions may not be included.

The first design group sub region 622 may include the design image. The processor 120 may include the design image included in each of the one or more design files included in the design group. The first design group subregion 622 and the first sub region 420 may display the partially different design images, but may include the design images expressed in the same manner. The first design group sub region 622 may be used for displaying a thumbnail for the design file. The first design group sub region 622 may display an image obtained by converting the design image included in the design file in a small size. That is, the design image is displayed in the first design group sub region 622, thereby enabling the user to easily check the information about the design file. For example, the user may determine to include only a second design file in the design group among a first design file, the second design file, and a third design file included in the assortment group. The first design group sub region 622 may include information about the second design file. The particular description for the first design group sub region is merely illustrative, and the present disclosure is not limited thereto.

The first design group sub region 622 may include the design image displayed according to a predetermined design image attribute. The design image attribute may be a method of displaying the design image. The design image attribute may include at least one of an attribute displaying a design image two-dimensionally, an attribute displaying a design image three-dimensionally, an attribute displaying a design image in a video, and an attribute displaying a design image in a specific color or material.

The third design group sub region 626 may include one or more design image attribute objects changing the design image. The design image attribute may be the method of displaying the design image as described above. The design image attribute objects included in the third design group sub region 626 and the third sub region 440 may be the same. The design image attribute object included in the third design group sub region 626 may include at least one of a three-dimensional attribute object, a rendering attribute object, and a design data attribute object. The particular description for the design image attribute object is merely illustrative, and the present disclosure is not limited thereto.

The first design group sub region 622 may include the design image of which the attribute is changed in response to the user selection input for the design image attribute object of the third design group sub region 626. The processor 120 may receive the user selection input for the design image attribute object of the third design group sub region 626. The processor 120 may change the design image of the first design group sub region 622 to correspond to the design image attribute object selected by the user and display the changed design image.

That is, the user may check the design attributes or the design characteristics for each of the design files included in the design group through the design image of the first design group sub region 622. The user may check the virtualized design image of various angles or various attributes while changing the attribute of the design image included in the first design group sub region 622 through the selection input for the design image attribute object included in the third design group sub region 626. The particular descriptions for the design image attribute object and the design image are merely illustrative, and the present disclosure is not limited thereto.

The second design group sub region 624 may include one or more design attribute objects. The design attribute object may be associated with the design attribute for at least one of a design material and a design color. The second design group sub region 624 may include information on the design attributes of the design file included in the design group. That is, the second design group sub region 624 may include at least some of the design attributes among one or more design attributes included in the design file of the assortment group. The second design group sub region 624 may include information about at least some of the design attributes, which are determined to be included in the design group by the user, among one or more design attributes. For example, one design file of the assortment group may include a first design attribute (that is, a single black color), a second design attribute (that is, a black check), and a third design attribute (that is, a navy check). The user may determine to include only the third design attribute that is at least some of the design attributes among the plurality of design attributes included in one design file of the assortment group in the design group. The second design group sub region 624 may display only the information about the third design attribute included in the design group. The particular description for the second design group sub region is merely illustrative, and the present disclosure is not limited thereto.

The design group layer may include an annotation region 610. The processor 120 may receive an annotation input of the user through the annotation region 610. Otherwise, the processor 120 may display an annotation input by the user in the annotation region 610. The annotation region 610 may include one or more annotation inputs. Each of the one or more annotation inputs may be associated with the design file. For example, the annotation region 610 may include an indication indicating that a first annotation input is related to the first design file. The annotation input may include additional data for the design file included in the design group. The additional data may be contents that one user wants to deliver to another user for the design file. For example, the additional data may be feedback, notes, and the like for the design information included in the design file. When the designer delivers the design group to the brand company, the brand company may deliver the feedback for a portion to be corrected through the annotation input. Otherwise, when the brand company delivers the design group to a clothing manufacturing factory, the brand company may also deliver the part that needs to be carefully treated when clothing is manufactured through the annotation input. The particular description for the annotation input is merely illustrative, and the present disclosure is not limited thereto.

The design group generating layer 400 may include two or more design file regions 410. The design group generating layer 400 may change a display method of a design image displayed in other remaining design file regions correspondingly and display the changed display method in response to the user input for changing a display method of the design image displayed in one design file region among the two or more design file regions. The processor 120 may also change a display method of the remaining design image correspondingly in response to the reception of the user input for changing the display method of one design image. The display method of the design image may be changed according to the user selection input for the design image attribute objects 442, 444, and 446. That is, when the user changes the display method of one design image to the three-dimensional display method, the design images included in the remaining design file regions may also be three-dimensionally displayed correspondingly. The display method of the design image may be changed according to a design image rotation input of the user for changing a display angle of the design image. That is, when the user rotates one design image included in the design file region by 45°, the design images included in the remaining design file regions may be rotated by 45° correspondingly. The particular description for the change of the display method is merely illustrative, and the present disclosure is not limited thereto.

The design group layer may include two or more design group design file regions 620. The design group layer may change the display method of the design images displayed in other remaining design group design file regions 620 correspondingly and display the changed display method in response to a user input for changing the display method of the design image displayed in one design group design file region among the two or more design group design file regions 620. The processor 120 may also change a display method of the remaining design image correspondingly in response to the reception of the user input for changing the display method of one design image. The display method of the design image may be changed according to a user selection input for the design image attribute object included in the third design group sub region 626. That is, when the user changes the display method for one design image from size 34 to size 42, the design images included in the remaining design group design file regions may be changed from size 34 to size 42 correspondingly and displayed with the changed size. The display method of the design image may be changed according to a design image rotation input of the user for changing a display angle of the design image. That is, when the user rotates one design image included in the design group design file region by 45°, the design images included in the remaining design file regions may be rotated by 45° correspondingly. The particular description for the change of the display method is merely illustrative, and the present disclosure is not limited thereto.

The design group layer may include two or more design group design file regions 620. When an input of the user is received for one design group design file region among the two or more design group design file regions 620, one design group design file region corresponding to the user input may be enlarged and displayed large. For example, when the processor 120 recognizes that a mouse pointer is located in one design group design file region, the processor 120 may enlarge the design group design file region related to the corresponding design file and display the enlarged design group design file region in the user interface. The processor 120 may enlarge and display one design group design file region in the upper layer of the design group layer. In the upper layer, a portion including the design file region is opaquely displayed and the remaining portions are semi-transparently displayed, so that some design group design file regions included in the design group layer may be shown through the semi-transparent portion. The particular description for the operation of enlarging and displaying the design file region is merely illustrative, and the present disclosure is not limited thereto.

The design file region 410 included in the design group generating layer 400 and the design group design file region 620 included in the design group layer may be linked through various paths for checking related data, respectively. The related data may be, for example, a layer capable of correcting design data, a layer capable of correcting design data, a shopping platform, and various information, such as a homepage of a related company, but is merely illustrative, and the present disclosure is not limited thereto. According to the exemplary embodiment of the present disclosure, the design file region 410 and the design group design file region 620 may be linked with the layers for checking the design data, respectively. For example, when the user clicks the design data link displayed in each of the design file region 410 and the design group design file region 620, the user may check the design data. The design data may be data for at least one of a color, a pattern, a material, and a subsidiary material of an article required for producing the article as described above. For the user interface displaying the design data, the description of the present specification is incorporated by reference to the entirety of the Korean Patent Application No. 10-2019-0172432.

The processor 120 may display a list including two or more generated design groups in the user interface. In the list, only brief information about the two or more design groups may be displayed in the text. For example, information on at least one of a subject that identifies and generates design files for each of the two or more design groups, a time period, and a design characteristic may be displayed in text. When the mouse pointer is located on one design group included in the list, the processor 120 may display a preview for the corresponding design group in the user interface. The preview for the design group may include the design images of at least some of the design files included in the design group. That is, the user may check each of the design groups in the list including the plurality of design groups through the preview. The preview displays at least one design image, so that the user may intuitively check the design clothing which is associated with the corresponding design group. The particular description for the preview is merely illustrative, and the present disclosure is not limited thereto.

By delivering additional data to another user through the annotation input, the efficient communication for the design may be performed among multiple parties. The feedback, which has been delivered by phone or a handwritten manner previously, is directly displayed and delivered to the online design group, thereby improving accuracy for the delivery of the feedback.

The processor 120 may perform voting for one or more design files included in the design group. The processor 120 may receive a voting to select only at least some of the design files from one user. Otherwise, the processor 120 may select a voting from one user to vote in favor of or against the design file. The processor 120 may include only the design files that have been voted equal to or larger than predetermined threshold votes in the design group, and delete the remaining design files from the design group. Otherwise, the processor 120 may delete the design files that have been voted equal to or larger than predetermined opposition votes from the design group. The particular description for the voting method is merely illustrative, and the present disclosure is not limited thereto, and various voting methods for the design file included in the design group may be all included.

Figure 8:
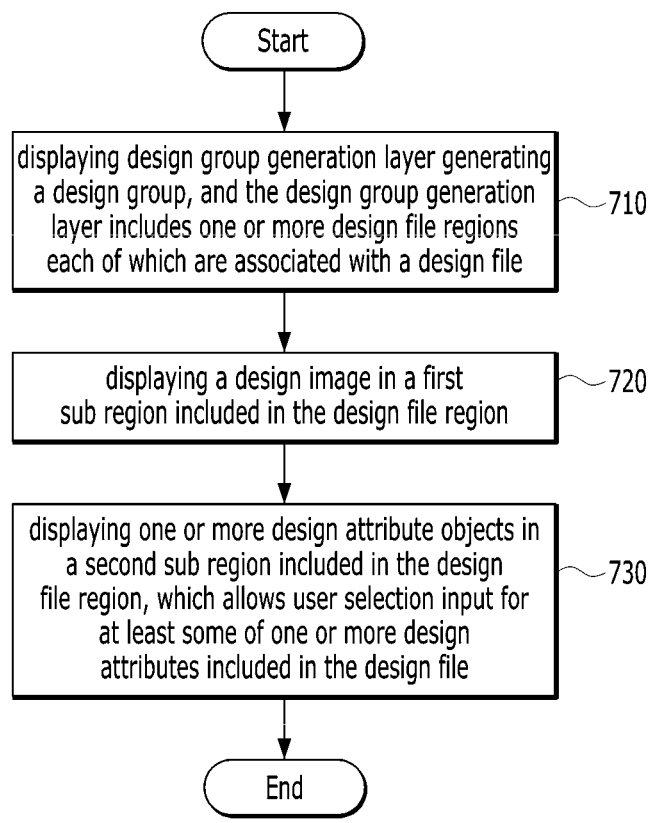
FIG. 8 is a flowchart for providing a user interface displaying design information according to an exemplary embodiment of the present disclosure.

FIG. 8 is a flowchart for providing a user interface displaying design information according to an exemplary embodiment of the present disclosure.

The computing device 100 may display a design group generation layer that generates a design group and includes one or more design file regions associated with the design files, respectively (710). The design group may be a data set visualizing and displaying information related to a designed design. The computing device 100 may generate a design group to include design files for a design attribute corresponding to a user selection input in response to the user selection input for at least some of the one or more design attribute objects. The design group may be associated with at least one of a subject that identifies or generates design files included in the design group, a time period for which the design files are used, and the design characteristics of the design files. The design file may include information related to the designed design.

The computing device 100 may display the design group generation layer including a design file addition object of adding a new design file in addition to the design file.

The computing device 100 may display a design image in a first sub region included in the design file region (720). The computing device 100 may change an attribute for the design image and additionally display the design image of which the attribute is changed in the first sub region in response to the user selection input for a design image attribute object of a third sub region.

The computing device 100 may display one or more design attribute objects allowing a user selection input for at least some of one or more design attributes included in the design file in a second sub region included in the design file region (730). The design attribute object may be associated with the design attribute for at least one of a design material and a design color.

The computing device 100 may distinguish the design attribute object corresponding to the user selection input among one or more design attribute objects and other design attribute objects and additionally display the distinguished design attribute objects in the second sub region.

The computing device 100 may display one or more design image attribute objects changing the design image in the third sub region included in the design file region. One or more design image attribute objects may include at least one of a three-dimensional attribute object which displays the design image in three-dimension, a rendering attribute object which displays the design image in a video, and a design data attribute object which changes at least one of a color and a material of the design image and displays the changed design image.

The computing device 100 may display a design group generation layer including one or more design group type selection objects. The design group type selection object may be related to the method of displaying the design files included in the design group.

The computing device 100 may display a design group region displaying that the design group including the design files for the design attribute corresponding to the user selection input is generated in response to the user selection input for at least some of one or more design attribute objects.

The computing device 100 may display a design group layer that displays the generated design group and includes one or more design group design file regions associated with the design group design files included in the design group, respectively. The design group design file region may include a first design group sub region displaying the design image included in the design group design file. The design group design file region may include a second design group sub region allowing a user selection input for one or more design attributes included in the design group design file. The design group layer may include an annotation region allowing a user annotation input for the design group design file.

According to an exemplary embodiment of the present disclosure, a user interface providing design information may be implemented by logic providing design information.

The user interface may be implemented by: logic for displaying a design group generation layer which generates a design group and includes one or more design file regions associated with the design files, respectively; logic for displaying a design image in a first sub region included in the design file region; and logic for displaying one or more design attribute objects in a second sub region included in the design file region, which allows user selection input for at least some of one or more design attributes included in the design file.

The logic providing the user design information may also be implemented by a module, a circuit, or a means corresponding to the logic.

Figure 9:
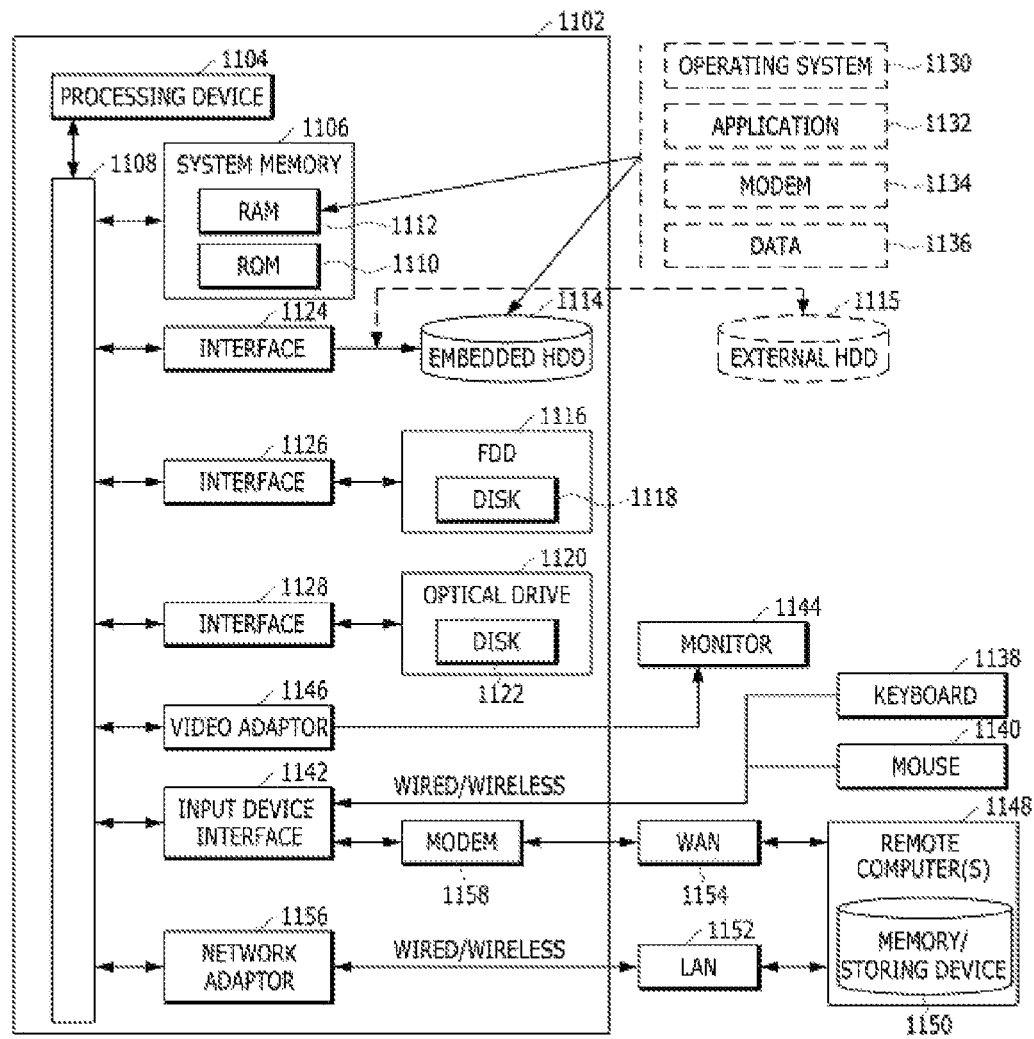
FIG. 9 is a block diagram illustrating a computing device according to an exemplary embodiment of the present disclosure.

FIG. 9 is a block diagram illustrating a computing device according to an exemplary embodiment of the present disclosure.

FIG. 9 is a simple and general schematic diagram illustrating an example of a computing environment in which the exemplary embodiments of the present disclosure are implementable.

The present disclosure has been generally described in relation to a computer executable command executable in one or more computers, but those skilled in the art will appreciate well that the present disclosure may be implemented in combination with other program modules and/or in a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini-computer, and a mainframe computer.

The exemplary embodiments of the present disclosure may be carried out in a distributed computing environment, in which certain tasks are performed by remote processing devices connected through a communication network. In the distributed computing environment, a program module may be positioned in both a local memory storage device and a remote memory storage device.

The computer generally includes various computer readable media. A computer-accessible medium may be a computer readable medium regardless of the kind of medium. The computer readable medium includes volatile and non-volatile media and transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a read-only memory (RAM), a read-only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage devices, or other predetermined media, which are accessible by a computer and are used for storing desired information, but is not limited thereto.

The computer readable transport medium generally includes all of the information transport media, such as other transport mechanisms, which implement a computer readable command, a data structure, a program module, or other data in a modulated data signal. The modulated data signal means a signal, of which one or more of the characteristics are set or changed to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a specific time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operating system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operating systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a gamepad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are generally in an office and a company and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. It will be appreciated well that the illustrated network connection is illustrative, and other means for setting a communication link may be used between the computers.

The computer 1102 operates communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a predefined structure, such as a network in the related art, or maybe simply ad hoc communication between at least two devices.

The Wi-Fi enables a connection to the Internet and the like even without a wire. Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or maybe operated in a product including both bands (dual bands).

Those skilled in the art may appreciate that information and signals may be expressed by using predetermined different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. To clearly describe the compatibility of the hardware and the software, various illustrative components, blocks, modules, circuits, and operations are generally illustrated above about the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium storing a computer program, wherein when the computer program is executed by one or more processors of a computing device, the computer program provides a user interface (UI) to display design information of garments, the user interface includes:
    a design group generation layer for a design group including a plurality of wearable articles, the design group generation layer including two or more design file regions that are displayed simultaneously; and
    wherein each of the two or more design file regions includes:
        a first sub region displaying a design image of a wearable article of a corresponding design file; and
        a second sub region displaying one or more design attribute objects of the wearable article, the one or more design attribute objects selectable to cause the design image of the corresponding design file to be updated for display in the first sub region but retain unchanged one or more design images other than the design image of the corresponding design file simultaneously displayed with the corresponding design file.

2. The non-transitory computer readable medium according to claim 1, wherein the user interface further includes a design group region displaying information on generation of the design group, the design group region displayed simultaneously with the design group generation layer.

3. The non-transitory computer readable medium according to claim 1, wherein the design file region further includes a third sub region displaying one or more design image attribute objects for changing the design image displayed in the first sub region.

4. The non-transitory computer readable medium according to claim 3, wherein the first sub region is adjacent to the third sub region or at least a part of the first sub region and the third sub region overlap.

5. The non-transitory computer readable medium according to claim 1, wherein the one or more design image attribute objects further include, a rendering attribute object for rendering and displaying the design image, a size attribute object for displaying the design image according to a selected size, or a design feature attribute object for changing a feature of the design image.

6. The non-transitory computer readable medium according to claim 5, wherein the feature of the design image includes at least one of color, texture, or material of the wearable article.

7. The non-transitory computer readable medium according to claim 1, wherein the one or more design attribute objects are related to at least one of color, texture, or material.

8. The non-transitory computer readable medium according to claim 1, wherein the second sub region displays a subset of the design attribute objects applicable to the design group from a plurality of design attribute objects.

9. The non-transitory computer readable medium according to claim 1, wherein the second sub region includes, a predetermined number of design attribute objects, and an arrow object which identifies other design attribute objects.

10. The non-transitory computer readable medium according to claim 1, wherein the design group is related to at least one of a subject which identifies and generates design files included in the design group, time period when the design files are used, or design characteristics of the design files.

11. The non-transitory computer readable medium according to claim 1, wherein the design group generation layer further includes one or more design group type selection objects indicating how design files in the design group are to be displayed.

12. The non-transitory computer readable medium according to claim 1, wherein the design file includes information related to a designed article, and wherein the design group generation layer further includes a design file addition object for adding a new design file in addition to the design file.

13. The non-transitory computer readable medium according to claim 1, wherein the user interface further includes a design group layer including one or more design group design file regions each of which is related to a design group design file included in the design group, and wherein the design group design file displays a generated design group, and wherein the design group design file region includes:
    a first design group sub region displaying design image included in the design group design file; and
    a second design group sub region allowing user selection input for one or more design attributes included in the design group design file.

14. The non-transitory computer readable medium according to claim 13, wherein the design group layer further includes an annotation region allowing a user annotation input to the design group design file.

15. The non-transitory computer readable medium according to claim 13, wherein the design group layer includes two or more design group design file regions, and wherein the design group layer changes an appearance of design in one of the two or more design group design file regions being manipulated and appearances of wearable articles in remaining one of the two or more design group design file regions.

16. The non-transitory computer readable medium according to claim 1, wherein the first sub region displays a different visual expression on the design image according to a degree of fitting of the wearable article in response to receiving selection of a fitting map object.

17. The non-transitory computer readable medium according to claim 1, wherein the design group generation layer changes an appearance of the wearable article in at least one of the design file regions being manipulated by a user and appearances of wearable articles in other design file regions.

18. A method for providing design information, the method comprising:
- displaying a design group generation layer for a design group including a plurality of wearable articles, the design group generation including two or more design file regions that are displayed simultaneously;
- displaying a design image of a wearable article of a corresponding design file in a first sub region included in each of the design file regions;
- displaying design attribute objects of the wearable article in a second sub region included in each of the design file region;
- receiving selection of one of the design attribute objects from a user; and
- updating the design image of the wearable article of the corresponding design file for display but retaining unchanged one or more design images other than the design image of the corresponding design file simultaneously displayed with the corresponding design file, responsive to receiving the selection of the one of the design attribute objects.

19. A computing device, comprising:
- a processor including one or more cores;
- a memory storing instructions thereon, the instructions when executed by the processor cause the processor to:
  - display a design group generation layer for a design group including a plurality of wearable articles, the design group generation including two or more design file regions that are displayed simultaneously;
  - display a design image of a wearable article of a corresponding design file in a first sub region included in each of the design file regions;
  - display design attribute objects of the wearable article in a second sub region included in each of the design file region;
  - receive selection of one of the design attributes from a user; and
  - update the design image responsive to receiving the selection of the one of the design attribute objects of the wearable article of the corresponding design file for display but retaining unchanged one or more design images other than the design image of the corresponding design file simultaneously displayed with the corresponding design file, responsive to receiving the selection of the one of the design attribute objects.

* * * * *